United States Patent [19]

Daley

[11] 4,175,824
[45] Nov. 27, 1979

[54] DOOR VIEWER WITH BARREL FLANGE AND MATING LENS RECESS

[76] Inventor: Nicholas G. Daley, 1316 Cavalier, Suite 412, Richardson, Tex. 75080

[21] Appl. No.: 832,976

[22] Filed: Sep. 13, 1977

[51] Int. Cl.² ............................................. G02B 23/00
[52] U.S. Cl. ......................................... 350/8; 350/69; 350/257
[58] Field of Search ................. 350/8, 21, 69, 82, 198, 350/245, 230, 252, 257, 319, 67, 65, 61; 49/171; 220/82 A

[56] References Cited

U.S. PATENT DOCUMENTS

| 2,146,662 | 2/1939 | Albada | 350/21 |
| 2,229,594 | 1/1941 | Seiler | 49/171 |
| 2,538,077 | 1/1951 | Blosse | 350/230 |

FOREIGN PATENT DOCUMENTS

| 1254122 | 1/1961 | France | 350/230 |
| 1378584 | 10/1964 | France | 350/230 |
| 1378602 | 10/1964 | France | 350/69 |

Primary Examiner—Jon W. Henry

[57] ABSTRACT

Disclosed are alternative embodiments of a barrel type optical viewer for installation in a door or other type partition where the wide angle lens of the viewer is so connected with the forward barrel flange to avoid obstruction of the periphery of the lens. The lens is either permanently secured to the face of the flange or removably coupled therewith; and the interior bore of the barrel is lined or otherwise provided with opaque material.

1 Claim, 2 Drawing Figures

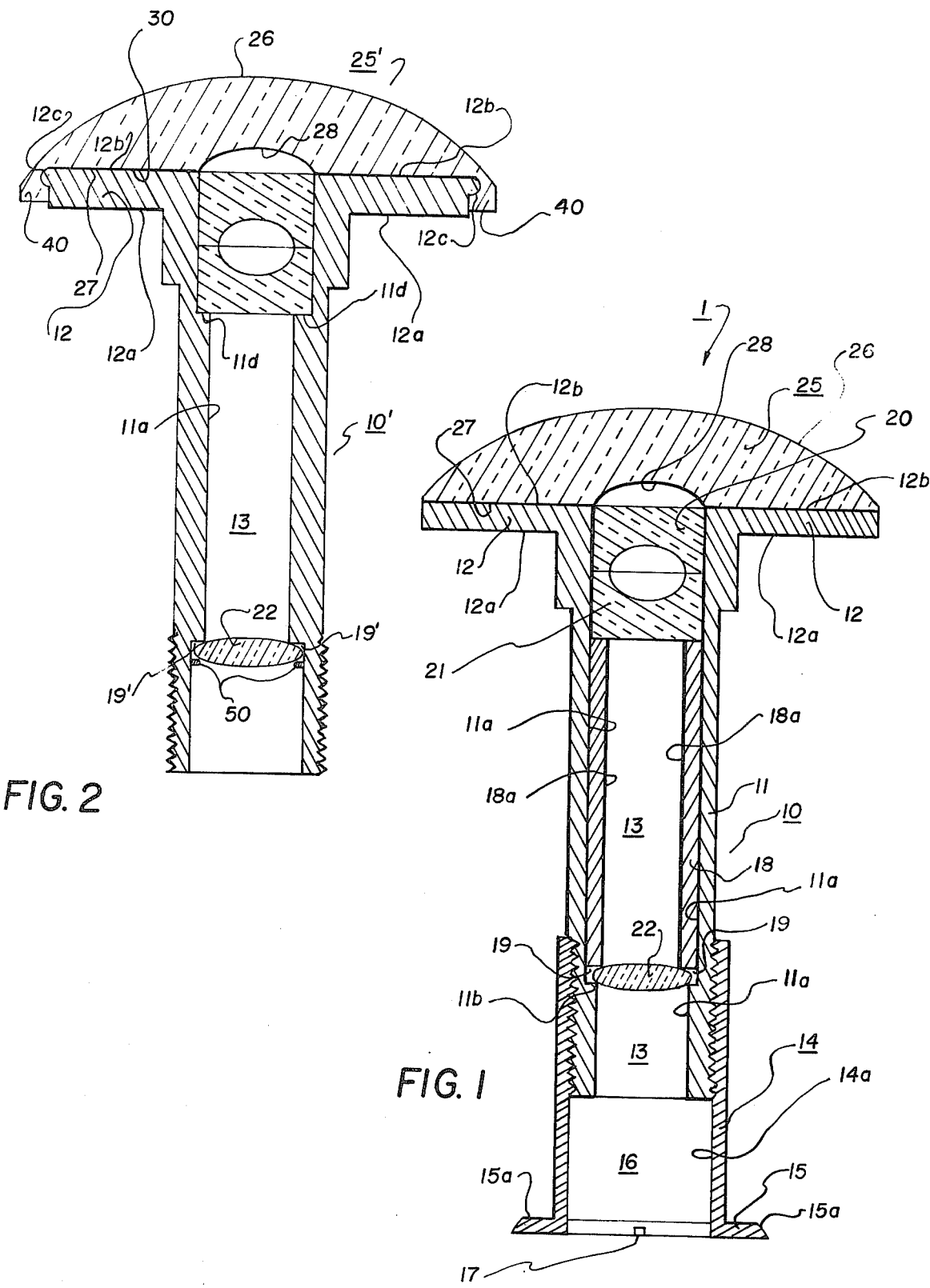

DOOR VIEWER WITH BARREL FLANGE AND MATING LENS RECESS

This invention relates to viewing devices, more particularly to door viewers, and even more particularly to door viewers of the type having an elongated lens holding barrel for installation within the outer door of a dwelling.

Viewing devices of the type for installation within the outer door of a dwelling to enable a resident thereof to recognize and identify the caller have been in widespread use for many years. The original design of such viewers, initially referred to as "peepholes", generally comprised an opaque plate or disc movable between a blocking and non-blocking position over an opening in the door, representative examples of such peepholes being described in U.S. Pat. Nos. to Shackley 878,245; Bauer 1,737,291; and Hardt 2,169,874. These devices have now been refined to the more popular and useful "barrel" type viewer comprising a main cylindrical housing or barrel for installation within the door, the front of the barrel including a circular flange for retention of a wide angle lens designed to increase the field of view from that obtainable from the original "peepholes", a typical representation of such viewer being described in U.S. Pat. No. 2,638,810 to Berleme.

While present designs of these "barrel" type viewers have generally accomplished their intended purpose, they are not entirely satisfactory for all conditions of service. Most significantly, the retaining flange for the wide angle lens comprises a lip extending over, and thus providing optical obstruction of, the periphery of the lens, thus undesirably restricting the field of view of the viewer or, at the very least, interfering with the image received thereby. As a consequence, the dwelling occupant's field of view is essentially limited to the space just outwardly of the door and/or prevents the clear viewing of an object sidewardly across the door's surface. Thus, a caller, in some instances, can avoid easy identification by standing to the side of the door viewer, thereby frustrating its purpose. Another disadvantage of currently employed door viewers is that the wide angle lens is permanently or non-removably attached to the barrel, thus increasing the cost of fabrication as well as preventing replacement of interchangeable lenses.

It is therefore a principal object of the present invention to provide a new and improved design of a door viewer.

It is another object of the present invention to provide a new and improved barrel type door viewer having a substantially enhanced and clearer field of view than that currently available from existing designs.

It is a still further object of the present invention to provide a barrel type door viewer of improved design which minimizes fabrication costs thereof as well as enabling replacement and interchangeability of the wide angle lens for such viewer.

In accordance with these and other objects, the door viewer of the present invention comprises a lens holding barrel having a retaining flange of a construction enabling unobstructed retention of the wide angle lens. In accordance with a first preferred embodiment of the viewer, the retaining flange has a flat surface for mateable connection with a corresponding flat face of the wide angle viewing lens. An alternate embodiment of the door viewer enables disconnectable coupling between the viewing lens and the barrel flange, thus facilitating removable attachment therebetween as well as providing interchangeable replacement of the lens.

Additional features of the invention, as well as further objects and advantages thereof, will become more readily apparent from the following detailed description taken in conjunction with the attached drawings, in which:

FIG. 1 is a cross-sectional view of a door viewer in accordance with a first preferred embodiment of the invention; and FIG. 2 is a cross-sectional view of an alternate embodiment of the invention, particularly illustrating the removable connection between the cylindrical barrel and wide angle lens of the viewer.

The drawings are not necessarily to scale, and in some instances, portions have been exaggerated in order to more particularly point out particular features of the invention.

Referring now to FIG. 1, an optical door viewer in accordance with a first preferred embodiment of the present invention is broadly depicted by the reference numeral 1. Accordingly, the viewer 1 comprises a main cylindrical housing or barrel 10 formed by a longitudinally extending stepped wall portion 11 terminating in a circular flange 12 at the forward end thereof. The inner circumference 11a of the longitudinal wall 11 defines an elongated bore 13 parallel to the viewing axis of the viewer.

Threadably joined to the barrel 10, and thus longitudinally adjustable with respect thereto, is a thin wall cylindrical end piece 14 provided with a circular flange 15 at the end thereof. A viewing passageway 16 defined by the inner circumference 14a is thus axially aligned with the bore 13. Similar to conventional door viewers of this type, the viewer 1 is adapted for installation in the outer door of a dwelling or the like by inserting the longitudinal portion 11 through the front (outer) end of the passageway formed in the door and the end piece 14 through the rear (inner) end of the passageway, the inner edge 12a of the flange 12 adapted to abut against the outer surface of the door; and the surface 15a of flange 15 adapted to abut against the inner surface of the door. Slots 17 in the flanged end of the end piece 14 are provided to receive the end fitting of a screwdriver or the like to secure the component parts of the assembly within the door passageway.

Provided within the forward end of the bore 13 are a pair of plano-concave lenses 20 and 21 abutting one another and so mounted to reverse-orient the concave portions of these lenses with respect to one another. Axially spaced from the lenses 20 and 21, and maintained in this spaced relationship by an elongated spacer tube 18, is a double convex lens 22 positioned within a circumferentially extending slot 19 defined between a shoulder 11b of the inner wall 11a and the end of the spacer tube 18. As an alternative to providing a separate spacer tube 18, and as subsequently described in greater detail with respect to FIG. 2, it is also contemplated that the inner circumferential wall 11a can be formed of a contour to support the lenses 20 and 21 and the lens 22 snapped into position at the desired location within bore 13.

In accordance with a unique feature of the invention represented by the embodiment of FIG. 1, the forward face 12b of the flange 12 is formed as a flat surface for its entire diameter; and securely affixed thereto, by gluing or welding for example, is a wide angle lens 25. The lens 25 is defined by a forward enlarged convex surface 26 intersecting (at its periphery) a flat base 27 coextensive with the outside diameter of the flange 12. The lens 25 further defines at a central portion thereof, a concave surface 28 intersecting the flat base 27 around a circumference coextensive with, or slightly less than, the circumference of the elongated bore 13 of the barrel 10. The lens 25 is effective to receive images of objects disposed in front of any point of the forward convex surface 26 (and in some instances behind and to the side of lens 25) and project such images along the viewing axis of the viewer, through the lenses 20, 21, and 22, for observation through the viewing passageway 16 of the end piece 14.

Since the wide angle lens 25 is mounted flush with the flange 12, and thus eliminates the need for any retaining flange around its peripheral edge which would optically obstruct the ends of the lens 25, the field of view of the viewer 1 is substantially enlarged from that, and enables clearer viewing of images than that, normally available from viewers which require such retainer flange.

As an additional feature of the present invention, the interior wall portions 11a, 18a, and 14a are made opaque by making such surfaces of blackened material or coating the surfaces with black paint or the like, thus eliminating the interference or reflection halo which would occur along the viewing axis without such feature.

The barrel 10 and end piece 14 may be respectively die cast or molded as single pieces, which can be formed of brass or zinc material or the like; and each of the lenses 20, 21, 22 and 25 can be formed of glass or of a plastic material, such as polycarbonate, for example. Alternatively, all of the component parts of the viewer 1, including the barrel 10, end piece 14, and the spacer tube 18 (when separately utilized) can also be formed as molded parts of a plastic material such as polycarbonate.

Referring now to FIG. 2, an alternate embodiment of the door viewer of the present invention is now described. Accordingly, in this example, the viewer (and the component parts thereof) will essentially be of the same construction as that previously described with reference to FIG. 1 with certain exceptions now described. Accordingly, the cylindrical housing of barrel (hereindesignated by the reference numeral 10') and the previously described wide angle lens (hereindesigned by the reference numeral 25') have been modified to enable removable coupling therebetween. Specifically, the flange 12 is formed of a diameter less than the outside diameter of the lens base 27 and is furthermore of a construction having a peripheral extension or lip 12c at the forward edge 12b. An annular shaped recess 30 is centrally disposed at the base of the lens 25' having a dimension and contour adapted to mateably engage and receive the so-configured flange 12. More specifically, the peripheral end 40 of the lens 25' resiliently engages or "snaps over" the lip 12c of the flange, thus enabling the removable coupling of the lens with the barrel 10'. It is apparent that this may be accomplished by having the body of the lens 25', or at least the end portion 40 thereof, of resilient material; or, alternatively having the peripheral edge of the flange of such resilient material.

It is apparent that the embodiment depicted in FIG. 2 still embodies the advantageous feature of having the end portion or periphery of the wide angle lens optically unobstructed, thus enlarging and avoiding interference of the field of view. Furthermore, the interrelationship between the lens 25' and flange 12 not only facilitates the quick and convenient attachment and detachment of the lens 25', but enables the use of replacement lenses therefor of varying types and dimensions. It is also pointed out that while FIG. 2 depicts one manner of removably attaching the lens 25' with the barrel 10', other methods or techniques may also be utilized to effect this objective.

It is also noted that, in lieu of a spacer tube 18, the interior wall 11a is configured to define a shoulder 11d for retaining the lenses 20 and 21 and a notch (hereindesignated by reference numeral 19') for retaining the lens 22. Flexible protuberances 50 may be provided at the base of notch 19' to enable the lens 22 to be inserted at the base of bore 13 and snapped into notch 19'.

While the above description has particularly referenced the use of the viewer in a door of a dwelling, it is believed apparent that such viewer can be utilized for observation of any space behind any type of door, partition, or the like.

Various modifications of the disclosed embodiments, as well as alternate embodiments, may become apparent to one skilled in the art without departing from the spirit and scope of the invention as defined by the appended claims.

What is claimed is:
1. A door viewer, comprising:
(a) a generally cylindrical shaped barrel having an interior wall defining an axially extending elongated bore, said barrel terminating at its forward end in a generally circular shaped flange,
(b) first lens means retained within the forward end of said bore, and second lens means retained within said bore and axially spaced from said first lens means,
(c) said flange having a substantially flat forward surface, and
(d) a wide angle viewing lens secured to the flat surface of, and removably coupled with, said flange, said wide angle viewing lens having an outside diameter at least equal to the outside diameter of said flange and further having a centrally disposed recess in the base portion thereof for mateable reception of said flange, the circumferential end portion of said wide angle viewing lens resiliently engaging said flange.

* * * * *